(12) United States Patent
Shemtov

(10) Patent No.: US 7,126,064 B1
(45) Date of Patent: Oct. 24, 2006

(54) CONNECTOR FOR AFFIXING CABLES WITHIN JUNCTION BOXES

(76) Inventor: Sami Shemtov, 1458 Commodore Way, Hollywood, FL (US) 33019

( * ) Notice: Subject to any disclaimer, the term of this patent is extended or adjusted under 35 U.S.C. 154(b) by 0 days.

(21) Appl. No.: 11/210,000

(22) Filed: Aug. 22, 2005

(51) Int. Cl.
*H02G 3/18* (2006.01)
(52) U.S. Cl. .................... 174/662; 174/650; 174/657; 174/658; 174/666; 439/460
(58) Field of Classification Search .............. 174/65 R, 174/59, 135, 60, 655 S, 650, 657, 658, 666; 439/460
See application file for complete search history.

(56) References Cited

U.S. PATENT DOCUMENTS

| | | | |
|---|---|---|---|
| 2,527,227 A | 10/1950 | Namet | |
| 2,555,292 A | 5/1951 | Poupitch | |
| 2,864,161 A | 12/1958 | Curtiss | |
| 3,139,768 A | 7/1964 | Biesecker | |
| 3,783,321 A * | 1/1974 | Patterson | 361/772 |
| 4,032,178 A | 6/1977 | Neuroth | |
| 4,046,451 A | 9/1977 | Juds et al. | |
| 4,131,379 A | 12/1978 | Gordy et al. | |
| 4,159,134 A | 6/1979 | Shemtov | |
| 4,314,094 A | 2/1982 | Smith | |
| 4,641,863 A | 2/1987 | Shemtov | |
| 5,137,470 A | 8/1992 | Doles | |
| 5,154,636 A | 10/1992 | Vaccaro et al. | |
| 5,214,247 A | 5/1993 | Tamm | |
| 5,266,050 A | 11/1993 | O'Neill et al. | |
| 5,284,449 A | 2/1994 | Vaccaro | |
| 5,334,051 A | 8/1994 | Devine et al. | |
| 5,383,377 A | 1/1995 | Boike | |
| 5,435,745 A | 7/1995 | Booth | |
| 5,518,420 A | 5/1996 | Pitschi | |
| 5,561,900 A | 10/1996 | Hosler, Sr. | |
| D376,415 S | 12/1996 | Shemtov | |
| 5,619,015 A | 4/1997 | Kirma | |
| 5,839,920 A | 11/1998 | Yurko et al. | |
| 5,911,790 A | 6/1999 | Bates et al. | |
| 5,984,723 A | 11/1999 | Wild | |
| 6,032,358 A | 3/2000 | Wild | |
| 6,109,964 A | 8/2000 | Kooiman | |
| 6,179,340 B1 | 1/2001 | Adolf et al. | |
| 6,217,384 B1 | 4/2001 | Strasser et al. | |
| 6,267,621 B1 | 7/2001 | Pitschi et al. | |
| 6,386,915 B1 | 5/2002 | Nelson | |
| 6,397,474 B1 | 6/2002 | Losinger | |
| 6,471,545 B1 | 10/2002 | Hosler, Sr. | |
| 6,476,319 B1 | 11/2002 | Shemtov | |
| 6,510,610 B1 | 1/2003 | Losinger | |
| 6,607,398 B1 | 8/2003 | Hennington | |

(Continued)

*Primary Examiner*—Dhiru R. Patel
(74) *Attorney, Agent, or Firm*—Craig A. Fieschko, Esq.; DeWitt Ross & Stevens S.C.

(57) ABSTRACT

A connector for affixing cables (e.g., of the type having wires bundled within a corrugated cover) within an electrical or other junction box has a body with a first end into which the cable cover (and the wires therein) may be inserted, and a second end configured to affix to the entry of a junction box, and which is configured to allow the wires of the cable to leave the connector and extend into the junction box. The connector has an engagement member thereon with one or more engagement legs which extend into the body of the connector, and into the internal passage of the connector body into which the cable is fit, to engage the cable cover and fix the cable to the connector body.

20 Claims, 1 Drawing Sheet

U.S. PATENT DOCUMENTS 6,640,439 B1  11/2003  Losinger
6,817,895 B1  11/2004  Kiely
6,840,803 B1  1/2005  Wlos et al.

* cited by examiner

CONNECTOR FOR AFFIXING CABLES WITHIN JUNCTION BOXES

FIELD OF THE INVENTION

This document concerns an invention relating generally to electrical wiring components, and more specifically to connectors for securing electrical cables to electrical junction boxes.

BACKGROUND OF THE INVENTION

In the electrical trade, junction boxes—small boxes/compartments made of plastic or other materials, with at least one open wall and having entries/apertures defined in other walls—are often installed in buildings at points where electrical wires are to be connected to components such as sockets, switches, outlets, and/or other wires. A junction box is installed at the point where the connection is desired, usually within the building wall or ceiling, by nailing or screwing the junction box to a stud within the wall or ceiling. Multi-wire cable is brought to the junction box and extended through an entry point in a junction box wall to enter the junction box interior. The cable is usually sheathed within a corrugated cover, often formed of a helically wound ribbon of metal or plastic, which serves to protect the wires of the cable while maintaining much of the cable's flexibility.

Since it is often desirable to firmly secure the cable to the junction box at its point of entry, connectors have been developed which engage the corrugated cable cover and the junction box together, and prevent the cable from being easily pulled from the junction box. See, e.g., U.S. Pat. No. 5,214,247 to Tamm and U.S. Pat. No. 6,817,895 to Kiely. However, these often require that the connector be crimped about the cable cover, and/or that a screw or similar fastener be extended through the connector to engage the cable cover. These arrangements can be inconvenient because they require the use of tools to connect the cable to the junction box, and in some instances the connection may need to be performed within tight confines (e.g., within a small hole in a wall), making the operation difficult to perform. Additionally, the need to use tools increases the time needed to install cables within junction boxes, since the steps of inserting and fixing the connector within the junction box, inserting the cable within the connector, obtaining and using a tool to fix the cable within the connector, etc. often require that an electrician or other installer pick items up, set them down, switch them from hand to hand, etc., which can rapidly grow tedious and annoying.

SUMMARY OF THE INVENTION

The invention involves a cable connector which is intended to at least partially solve the aforementioned problems. To give the reader a basic understanding of some of the advantageous features of the invention, following is a brief summary of a preferred version of the cable connector. As this is merely a summary, it should be understood that more details regarding preferred versions may be found in the Detailed Description set forth elsewhere in this document. The claims set forth at the end of this document then define the various versions of the invention in which exclusive rights are secured.

It is initially useful to refer to the accompanying drawings, which illustrate exemplary cable connectors 100 (in FIGS. 1A–1B) and 200 (in FIG. 2). As a brief overview, the cable connector 100 of FIG. 1A has a body 102 for receiving a cable, and an engagement member 104 for insertion within the body 102 to engage the cable therein (with the engagement member 104 being shown spaced from the body 102). FIG. 1B then shows the internal passage 106 of the body 102 from the first body end 108, into which the cable is inserted (with the opposing second body end 110 being visible in FIG. 1A). FIG. 2 then shows an alternative cable connector 200 with its second body end 210 engaged to an (exemplary) electrical junction box 10, with a section of an (exemplary) cable 12 shown in a position wherein it is about to be inserted in the first body end 208, at which point the engagement member 204 can be depressed into the body 202 to engage the corrugated cover 14 of the cable 12. As will be discussed below, the alternative cable connector 200 is functionally largely equivalent to the cable connector 100 of FIGS. 1A and 1B.

Referring particularly to FIGS. 1A and 1B, the body 102 of the cable connector 100 includes an outer body surface 112 extending between the opposing first and second body ends 108 and 110, and an internal passage 106 into which a cable may be inserted, with the internal passage 106 extending between the first and second body ends 108 and 110. One or more slots 114 (two in the case of the exemplary cable connector 100) are then defined in the body 102, with each slot 114 having a slot depth extending between the outer body surface 112 and the internal passage 106. Each slot 114 also has a slot length extending along the outer body surface 112 between opposing slot sides 116 and opposing slot faces 118 (with the slot faces 118, being defined along the length of the slot 114, being wider than the slot sides 116). Where two or more slots 114 are included in the body 102, they are preferably adjacently situated in the body 102 on the same side of the internal passage 106.

Referring particularly to FIG. 1A, the engagement member 104 then includes one or more engagement legs 120 extending therefrom (two in the case of the engagement member 104, one for each of the slots 114). Each engagement leg 120 extends from a driving end 122 from which force is to be applied to urge the engagement leg 120 into a slot 114 in the body 102, to an opposing insertion end 124 sized for at least substantially complementary insertion within the slot 114. The insertion end 124 thus has opposing engagement leg sides 126 situated between opposing engagement leg faces 128, wherein the engagement leg faces 128 are wider than the slot sides 116, so that the engagement leg faces 128 extend along the slot length to rest adjacent the slot faces 118 when the engagement leg 120 is inserted within the slot 114. A bridge 130 joins the driving ends 122 of the engagement legs 120 in spaced relation so that the engagement legs 120 are simultaneously received in the slots 114. When a user urges his/her finger against the bridge 130 of the engagement member 104 to drive the bridge 130 radially inwardly toward the outer body surface 112, the engagement legs 120 are simultaneously urged toward the internal passage 106 to have the insertion ends 124 engage any cable therein. The insertion ends 124 of the engagement legs 120 each preferably have a concave depression 132 defined between their opposing engagement leg sides 126 so that when the insertion ends 124 encounter the corrugated cover 14 of the cable 12, the insertion end 124 fits within a groove 16 of the cable cover 14 with the cable cover 14 engaged within the concave depressions 132. The engagement legs 120 (and the slots 114 of the body 102) are preferably spaced at the same pitch as conventional corrugated cable cover 14 so that adjacent engagement legs 120 fit into adjacent cable cover grooves 16. Additionally, the planes of the engagement legs 120 (and the slots 114) are preferably oriented at least substantially perpendicular to the axis of the internal passage 106, but at a slight angle n to the perpendicular (e.g., 1–20 degrees, see FIG. 1A) so that the planes of the engagement legs 120 better fit into and engage the cable cover grooves 16 (which are likewise at an angle to the perpendicular).

So that the engagement member 104 retains the cable 12 within the body 102, the engagement legs 120 and slots 114 are preferably configured so that the engagement legs 120 exhibit more resistance to withdrawal from their slots 114 than to insertion. This is preferably done by providing protruding teeth 134 on each engagement leg 120 (see FIG. 1A), with the teeth 134 being arrayed in series between the insertion end 124 and the driving end 122, so that the teeth 134 sequentially engage the body 102 about the slot 114 when the engagement leg 120 is inserted within the slot 114 and urged toward the internal passage 106. The teeth 134 are preferably angled upwardly (away from the insertion end 124 of each engagement leg 120 and toward the driving end 122), or include beveled faces 136, so that they effectively ratchet against the body 102 when the engagement leg 120 is inserted within the slot 114, thereby offering the engagement member 104 lesser resistance to insertion than to removal. The ease of insertion can further be enhanced by beveling at least a portion of the body 102 bounding the slot 114 to cooperate with the angling/beveling of the teeth 134. As an example, FIG. 1A illustrates teeth 134 arrayed along the engagement leg face 128 of each engagement leg 120, and a portion 138 of the corresponding slot face 118 is beveled to coverage towards the other of the slot faces 118 as the slot 114 extends along its slot depth toward the internal passage 106 (i.e., the width of the slot 114 converges along its slot depth along at least a portion of the slot 114). Beneficially, the teeth 134 hold the engagement legs 120 within the slots 114 when the engagement legs 120 are initially only partially inserted (with the engagement legs 120 only marginally extending into the internal passage 106), so that a user may install an engagement member 104 on the body 102, install the body 102 on a junction box 10 and insert a cable 12 therein, and then depress the engagement member 104 to more fully insert the engagement legs 120 and engage a cable 12. Thus, a user may "assemble" the connector 100 by installing the engagement member 104 on the body 102 before the connector 100 is even installed on a junction box 10 and/or even before a cable 12 is inserted. Thereafter, to engage a cable 12, a user only needs to actuate the engagement member 104 to move its engagement legs 120 to engage the cable 12.

In the preferred form of the engagement member 104 shown in FIGS. 1A and 2, the engagement member 104 has a staple-like U-shaped configuration wherein the engagement legs 120 are substantially planar bar-shaped members which are somewhat flexible with respect to the bridge 130, better allowing them to be urged into the slots 114 despite any casting imperfections that may be present in the body 102 (since the body 102 is preferably formed of cast metal, though it could be formed of plastic or other substances). To provide additional rigidity to the engagement legs 120 so that they do not bow outwardly when the bridge 130 is pressed, the engagement legs 120 may include one or more raised ribs 140 spaced from the teeth 134, and which extend between the insertion ends 124 and the driving ends 122 of the engagement legs 120 (with the preferred engagement member 104 each including a pair of ribs 140 on the engagement leg faces 128 on opposing sides of the teeth 134). The slots 114 may then bear notches 142 extending along their slot depths between the outer body surface 112 and the internal passage 106, with the notches 142 being sized and aligned to complementary receive the ribs 140 when the engagement legs 120 are inserted within their slots 114.

The foregoing arrangement allows the cable connector 100 to rapidly and firmly mount a cable 12 within an electrical junction box 10 by inserting a body end 110 of the connector 100 within an entry 18 of the junction box 10 and affixing it therein, then inserting a cable 12 within the opposite body end 108 until the corrugated cable cover 14 rests within the internal passage 106, and then simply depressing the (previously installed) engagement member 104 with a finger to have it engage the cable cover 14. Some steps in this process are illustrated in FIG. 2, wherein the cable connector 200 has a second body end 210 which is externally threaded, allowing it to be inserted into a junction box entry 18 and installed by simply screwing a nut 20 (here a star nut) thereon. The cable 12 is then engageable within the cable connector 200 without the need for tools, and with only one hand being needed to insert the cable 12 within the body 202 and to reach over (e.g., with a thumb) to actuate the engagement member 204 and secure the cable 12 (with such one-handed actuation being very useful when working in small spaces). Note that the cable connector 100 of FIG. 1A illustrates an alternative arrangement for the second body end 110, wherein the second body end 110 is externally threaded by the use of protruding camming members 144 (partial threading).

Further advantages, features, and objects of the invention will be apparent from the following detailed description of the invention in conjunction with the associated drawings.

DETAILED DESCRIPTION OF PREFERRED VERSIONS OF THE INVENTION

Figure 1A:
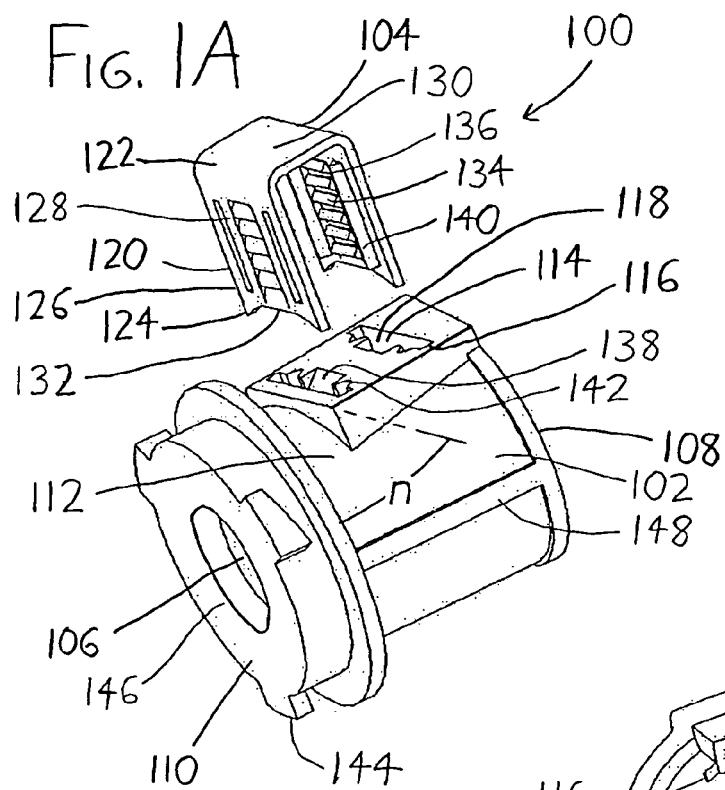
FIG. 1A is a perspective view of a first exemplary connector 100 as viewed from the second body end 110, showing the engagement legs 120 of the engagement member 104 spaced from the slots 114 of the body 102 wherein they are to be inserted.
Figure 1B:
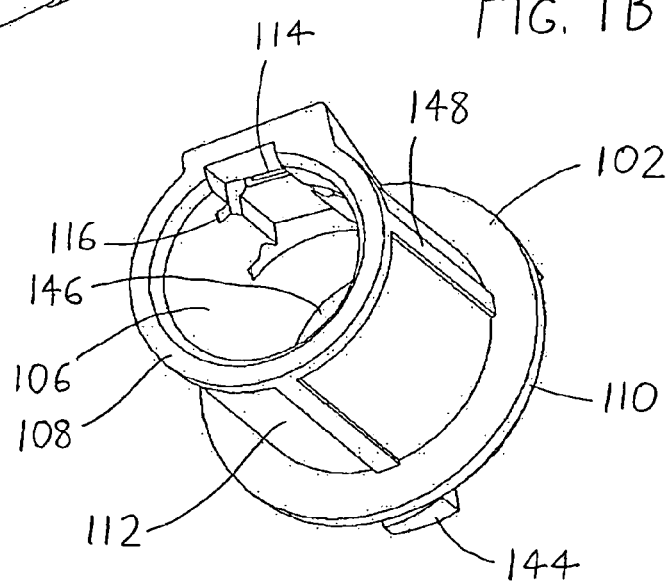
FIG. 1B is a perspective view of the connector 100 of FIG. 1A as viewed from the first body end 108.

To expand on the discussion given in the Summary above, the cable connector is intended to be installed within a junction box 10 (see FIG. 2) by attaching it to a junction box entry 18 (with the body 202 of the exemplary cable connector 200 being shown attached at the second body end 210), and to receive a cable 12 within the internal passage of the cable connector for attachment therein. These steps are preferably performable with a single hand, with no or few tools, and with as few steps as possible to achieve fixture of the cable connector to both the junction box and the cable. The cable connectors 100 and 200 shown in the drawings attain these goals, but it should be understood that the cable connector may assume a wide variety of forms other than those illustrated in the drawings. A number of different exemplary modifications will now be described, using the cable connector 100 of FIGS. 1A–1B as a point of reference.

Initially, while the exemplary cable connector 100 has a body 102 with a generally tubular configuration and a cylindrical internal passage 106, it need not necessarily have this configuration. As one example, note that the cable connector 100 has a first body end 108 sized to receive both a corrugated cover 14 for a cable 12 and any wires 22 therein (with the first body end 108 about the internal passage 106 preferably being beveled to allow easier insertion of the cable 12), and a second body end 110 having a smaller opening onto the internal passage 106 (with an end plate 146 extending annularly inwardly at the second body end 110 to bound this opening). This arrangement allows a user to insert a cable 12 into the first body end 108 until the cable cover 14 encounters the end plate 146, with the end plate 146 blocking the passage of the cable cover 14 but allowing the wires 22 of the cable 12 to continue through the second body end 110. This arrangement allows a user to "feel" when a cable 12 is fully inserted into the connector 100, and that the cable 12 is ready for engagement by the engagement member 104. However, this arrangement is not essential, and the end plate 146 may be omitted at the second body end 110 so that the internal passage 106 has no obstructions.

Figure 2:
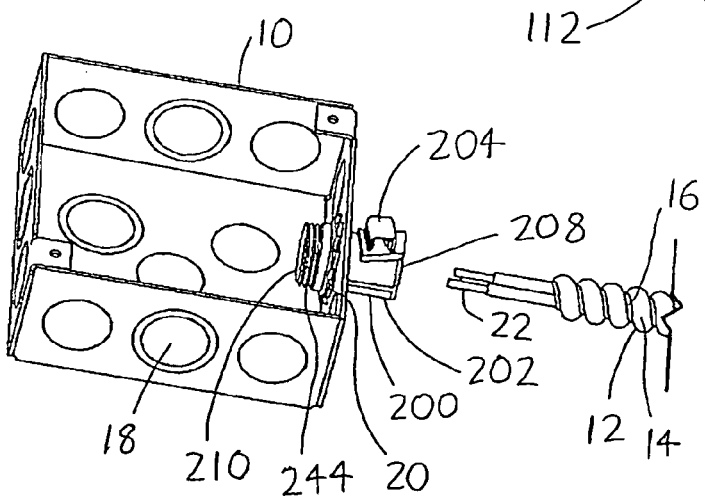
FIG. 2 is a perspective view of an alternative exemplary connector 200 having a threaded second body end 210 secured within an electrical junction box 10 by a nut 20, with the connector 200 then being ready to accept the cable 12, at which point the engagement member 204 can be depressed inwardly to engage the corrugated cable cover 14 and thereby secure the cable 12 to the junction box 10.

As suggested above, the second body end 110 can include a variety of means for attachment to a junction box 10 apart from the partial threading 144 (FIG. 1A) or the threading 244 (FIG. 2). As an example, the second body end 110 could include internal threading, and a flanged nut with external threading could extend therein to engage the second body end 110 to a junction box 10, with the flange of the nut holding the second body end 110 on the junction box 10. As another example, the means for attaching the cable connector 100 to the junction box 10 need not include threaded arrangements, e.g., the second body end 110 could use spring-loaded flanges such as those seen in U.S. Pat. No. 5,266,050 to O'Neil et al. It is also possible to provide both the second body end 110 and the first body end 108 with means for attachment to a junction box so that the body 102 of the cable connector 100 is effectively "reversible," i.e., either end may be affixed to a junction box 10, with the other end receiving an inserted cable. In this case, the opposing body ends 108 and 110 could bear the same or different forms of junction box attachment means (e.g., one end could include full threading and the other could include partial threading, etc.).

When threaded arrangements are used to affix the second body end 110 (and/or the first body end 108) to the junction box 10, it is preferable to include raised protrusions on the outer body surface 112, such as ridges 148 (see FIG. 1A) extending axially along the length of the body 102, so that the user's fingers (or tools such as a pliers/wrench) may more easily grip the body 102 and rotate it with respect to a junction box 10.

The engagement member 104 (and slot 114) may take a variety of forms different from those shown in the exemplary cable connector 100, with the engagement member 104 including any number of engagement legs 120 of virtually any configuration, and with the slot(s) 114 being shaped to complementarily to receive these engagement legs 120. (It should be understood that when it is said that the engagement legs 120 are complementarily received within the slots 114, this does not imply that the engagement legs 120 must fill the entireties of the slots 114; rather, it merely means that the slots 114 preferably closely receive the engagement legs 120 such that the engagement member 104 will be retained on the body 102 once one or more engagement legs 120 are initially inserted within their slots 114, so that a user does not need to hold the engagement member 104 on the body 102 to keep it there.) As an example, the engagement legs 120 could be formed as multiple rod-like prongs extending from the bridge 130, and arrayed in a line similar to the teeth on a comb, or in a spread array similar to the legs in a table, which are received within corresponding slots 114 (which need not be elongated, and could simply take the form of circular holes or the like). The engagement legs 120 preferably have a planar configuration because this allows the engagement legs 120 to better fit within the grooves 116 of a corrugated cable cover 14 (and thereby better restrain the cable 12 within the internal passage 106 of the body 102), but such a configuration is not required. Further, it is not essential that all engagement legs 120 enter slots 114 on the same side of the body 102 to engage a single side of the cable 12. As an example, the engagement member 104 might take the form of a C-shaped split ring, with engagement legs 120 extending radially inwardly at different points of the interior of the ring, with the engagement legs 120 fitting into circumferentially-spaced slots 114 in the body 102 when the ring is snapped about the outer body surface 112.

The teeth 134 on the engagement legs 120 may take a variety of forms, and it is possible that an engagement leg 120 might include more than one set of teeth 134, or that some engagement legs 120 on an engagement member 104 might bear teeth where others do not. The teeth 134 are preferably spaced to allow the engagement legs 120 to ratchet into the internal passage 106 in small increments (and thereby better grasp cables 12 of different diameters within the internal passage 106), though if cables 12 of only a single size are to be grasped by the cable connector 100, only a few teeth 134 (or only a single tooth 134) might be used.

Various preferred versions of the invention have been described to illustrate different possible features of the invention, and possible ways in which these features may be combined. The invention is not intended to be limited to the preferred versions of the invention described above, but rather is intended to be limited only by the claims set out below. Thus, the invention encompasses all different versions that fall literally or equivalently within the scope of these claims.

What is claimed is:
1. A cable connector comprising:
 a. a body including:
  (1) an outer body surface extending between opposing first and second body ends,
  (2) an internal passage into which a cable may be inserted, the internal passage extending between the first and second body ends,
  (3) a slot having:
   (a) a slot depth extending between the outer body surface and the internal passage, and
   (b) a slot length extending along the outer body surface between opposing slot sides, with the slot length being oriented at least substantially perpendicular to the axis of the internal passage;
 b. an engagement leg having a driving end and an insertion end sized for at least substantially complementary insertion within the slot, wherein the engagement leg exhibits more resistance to withdrawal from the slot than to insertion within the slot when the insertion end of the engagement leg is inserted into the slot from the outer body surface to extend into the internal passage.

2. The cable connector of claim 1 wherein the engagement leg includes:
   a. protruding teeth arrayed in series between the insertion end and the driving end, and
   b. one or more protruding ribs having lengths extending between the insertion end and the driving end.

3. The cable connector of claim 1 wherein the engagement leg includes one or more protruding teeth arrayed in series between the insertion end and the driving end, the teeth engaging the body about the slot when the engagement leg is inserted within the slot.

4. The cable connector of claim 3 wherein:
   a. the slot includes slot faces extending between the slot sides, and
   b. the teeth engage at least one of the slot sides when the engagement leg is inserted within the slot.

5. The cable connector of claim 3 further comprising one or more protruding ribs on the engagement leg, the ribs:
   a. being spaced from the teeth, and
   b. having lengths extending between the insertion end and the driving end of the engagement leg.

6. The cable connector of claim 3 wherein the teeth include at least one beveled face, whereby the teeth ratchet against the body when the engagement leg is inserted within the slot.

7. The cable connector of claim 1 wherein the slot is bounded by:
   a. the opposing slot sides, and
   b. opposing slot faces extending between the slot sides, wherein at least one of the slot faces is beveled to converge towards the other of the slot faces as the slot extends toward the internal passage.

8. The cable connector of claim 7 wherein the engagement leg includes one or more teeth arrayed in series between the insertion end and the driving end, the teeth protruding to engage the beveled slot face when the engagement leg is inserted within the slot.

9. The cable connector of claim 7 wherein the slot includes at least one notch defined therein, the notch extending along the depth of the slot between the outer body surface of the body and its internal passage.

10. The cable connector of claim 1 wherein:
    a. the insertion end of the engagement leg has opposing engagement leg sides situated between opposing engagement leg faces, wherein the engagement leg faces are wider than the slot sides, whereby the engagement leg faces extend along the slot length when the engagement leg is inserted within the slot; and
    b. at least one of the engagement leg faces includes a raised rib defined thereon, the rib extending from the insertion end of the engagement leg toward the driving end.

11. The cable connector of claim 10 wherein:
    a. the slot includes slot faces extending between the slot sides, and
    b. at least one of the slot faces includes a notch defined therein, the notch being situated to complementarily receive the nib when the engagement leg is inserted within the slot.

12. The cable connector of claim 1:
    a. wherein the body includes at least two of the slots, the slots being spaced adjacently along the body; and
    b. the engagement leg is defined as a portion of an engagement member, the engagement member having two or more of the engagement legs extending therefrom, wherein the engagement member further includes a bridge joining the driving ends of the engagement legs.

13. The cable connector of claim 1 wherein the length of the slot is oriented at an angle between 1 and 20 degrees to a plane oriented perpendicular to the axis of the internal passage.

14. The cable connector of claim 1 wherein the insertion end of the engagement leg includes opposing engagement leg sides with a concave depression defined therebetween.

15. The cable connector of claim 1 wherein at least one of the opposing first and second body ends includes threading defined thereon.

16. A cable connector comprising:
    a. a body including:
       (1) an outer body surface extending between opposing first and second body ends,
       (2) an internal passage into which a cable may be inserted, the internal passage extending between the first and second body ends,
       (3) a slot having:
          (a) a slot depth extending between the outer body surface and the internal passage, and
          (b) a slot length extending along the outer body surface between opposing slot sides;
    b. an engagement member having an engagement leg extending therefrom, the engagement leg having a length:
       (1) terminating in an insertion end, the insertion end being sized to be at least substantially complementarily fit within the slot,
       (2) including teeth arrayed thereon, with the teeth sequentially engaging the body as the insertion end is urged into the slot toward the internal passage.

17. The cable connector of claim 16 wherein:
    a. the engagement leg includes a rib protruding therefrom, the rib being spaced from the teeth and having a length extending between the insertion end and the driving end; and
    b. the slot includes a notch defined therein, the notch extending between the outer body surface of the body and the internal passage, with the notch being aligned to receive the rib when the insertion end of the engagement leg is fit within the slot.

18. The cable connector of claim 16 wherein:
    a. the body includes at least two of the slots, and
    b. the engagement member includes at least two of the engagement legs, the engagement legs being situated to simultaneously fit within the slots when the engagement member is urged radially inwardly toward the body.

19. A cable connector comprising:
    a. a body including:
       (1) an outer body surface extending between opposing first and second body ends,
       (2) an internal passage into which a cable may be inserted, the internal passage extending between the first and second body ends,
       (3) two or more slots, each slot having:
          (a) a slot depth extending between the outer body surface and the internal passage, and
          (b) a slot length extending along the outer body surface between opposing slot sides;
    b. an engagement member having two or more engagement legs extending therefrom, wherein:
       (1) the engagement legs are joined in spaced relation by a bridge;

(2) each engagement leg includes an insertion end sized for insertion within one of the slots to extend into the internal passage, wherein urging the bridge toward the outer body surface when the engagement legs are within the slots simultaneously urges the engagement legs toward the internal passage to engage any cable therein.

20. The cable connector of claim 19 wherein the slots are:

a. situated on the same side of the internal passage, and b. oriented at least substantially parallel to each other.

* * * * *